United States Patent
Zheng et al.

(10) Patent No.: US 9,612,448 B2
(45) Date of Patent: Apr. 4, 2017

(54) DISPLAY DEVICE AND WEARABLE GLASSES

(71) Applicants: Beijing Lenovo Software Ltd., Haidian District, Beijing (CN); Lenovo (Beijing) Co., Ltd., Haidian District, Beijing (CN)

(72) Inventors: Xiaopan Zheng, Beijing (CN); Feijun Weng, Beijing (CN); Fei Wu, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/652,915

(22) PCT Filed: Dec. 16, 2013

(86) PCT No.: PCT/CN2013/089564
§ 371 (c)(1),
(2) Date: Jun. 17, 2015

(87) PCT Pub. No.: WO2014/094581
PCT Pub. Date: Jun. 26, 2014

(65) Prior Publication Data
US 2015/0316780 A1    Nov. 5, 2015

(30) Foreign Application Priority Data

Dec. 17, 2012  (CN) .......................... 2012 1 0548711

(51) Int. Cl.
*G02B 27/26* (2006.01)
*H04N 13/04* (2006.01)
(Continued)

(52) U.S. Cl.
CPC ............... *G02B 27/26* (2013.01); *G02B 5/30* (2013.01); *G02B 5/3083* (2013.01);
(Continued)

(58) Field of Classification Search
CPC .. G02B 27/26; G02B 27/0172; H04N 13/044; H04N 13/0434; H04N 13/0459
See application file for complete search history.

(56) References Cited

U.S. PATENT DOCUMENTS 5,526,184 A    6/1996  Tokuhashi et al.
6,075,651 A    6/2000  Hoppe
(Continued)

FOREIGN PATENT DOCUMENTS

CN    101661163    3/2010
EP    1 024 388    8/2000

OTHER PUBLICATIONS

International Preliminary Report on Patentability issued for PCT Application Serial No. PCT/CN2013/089564 filed Dec. 16, 2013; dated Mar. 13, 2014, 8 pages.
(Continued)

*Primary Examiner* — Sultan Chowdhury
(74) *Attorney, Agent, or Firm* — Brinks Gilson & Lione; G. Peter Nichols

(57) ABSTRACT

A display device and wearable glasses that includes a fixing unit for maintaining the relative position between the display device and a user wearing same; an image source for generating corresponding image light according to image data; a first optical component for receiving the image light and transmitting the polarized light having a first polarization direction in the image light; and a second optical component for receiving and changing the polarized light having the first polarization direction into the polarized light having a second polarization direction perpendicular to the (Continued)

first polarization direction, and transmitting the polarized light having the second polarization direction to the first optical component, such that the polarized light having the second polarization direction is reflected to the eyes of the user by the first optical component.

16 Claims, 4 Drawing Sheets

(51) Int. Cl.
  *G02B 5/30* (2006.01)
  *G02B 27/28* (2006.01)
  *G02B 27/01* (2006.01)
(52) U.S. Cl.
  CPC ....... *G02B 27/0172* (2013.01); *G02B 27/283* (2013.01); *H04N 13/0434* (2013.01); *G02B 2027/0118* (2013.01); *G02B 2027/0178* (2013.01); *H04N 13/044* (2013.01)

(56) References Cited

U.S. PATENT DOCUMENTS

| | | | |
|---|---|---|---|
| 8,757,806 B2* | 6/2014 | Schuck | G03B 35/26 348/744 |
| 2002/0113752 A1* | 8/2002 | Sullivan | G02B 27/2278 345/6 |
| 2003/0223114 A1 | 12/2003 | Cado et al. | |
| 2008/0278812 A1 | 11/2008 | Amitai | |
| 2009/0322972 A1 | 12/2009 | Ando | |
| 2010/0103516 A1* | 4/2010 | McKnight | A63F 13/06 359/465 |
| 2012/0026305 A1* | 2/2012 | Kim | G02B 5/3083 348/58 |
| 2012/0057134 A1* | 3/2012 | Huang | G02B 27/26 353/8 |

OTHER PUBLICATIONS

Office Action issued in Chinese patent application serial No. 201210548711.3, dated Jul. 23, 2015, 9 pages.

* cited by examiner

DISPLAY DEVICE AND WEARABLE GLASSES

This application claims priority to International Application No. PCT/CN2013/089564 filed Dec. 16, 2013 and to Chinese Patent Appln. 201210548711.3 filed Dec. 17, 2012; the entire contents of each are incorporated herein by reference.

BACKGROUND

This disclosure relates to optical display technique, and more particularly to a display device and a wearable glasses apparatus.

Wearable displays are generally divided into two kinds of wearable displays of immerging type and see-through type. Wearable displays of see-through type have got more and more attention from people since they allow a user to see a picture displayed by a display and surrounding environment of the user at the same time.

The wearable displays of see-through type can be applied in augmented reality (AR for short hereinafter), and the AR is a technique for applying virtual information to real world and overlapping the virtual information and real environment together in real time and interacting, which is also referred as mix reality. Information that can't be known directly in the real world can be provided to us through the AR, so as to expand our sensing ability. For example, Google glasses is a wearable glasses display device of see-through type, which allows the user to see a real surrounding environment of the user through spectacle lenses of the glasses and allows the user to see virtual image through the spectacle lenses of the glasses at the same time.

The current wearable displays of see-through type usually adopt a multiple layers light splitting structure to implement lightening of a wave guide system, and this structure may enlarge an exit pupil distance and an exit pupil diameter of the overall system so that a watching range of human eyes is relatively comfortable at the same time. However, a manufacturing process of such multiple layers light splitting structure is relative complex, and an ability of mass production is poor, and stray light is easy to influence a quality of a whole picture.

There is another kind of wearable display of see-through type, which uses a layer of semi-reflective and semi-transmitted membrane to implement the light guide system, and it is obvious that it lowers an optical utilization ratio.

Therefore, there needs a new display device which is easy to be manufactured and has higher optical utilization ratio.

SUMMARY

This disclosure is suggested in consideration of above problems. A purpose of this disclosure is to provide a display device which constitutes the light guide system by using a polarization light splitter and resin material to improve efficiency of light utilization significantly and easy to implement lightening.

According to one aspect of this disclosure, there provides a display device including: a holding unit for holding a relative position relationship between the display device and a user when the user wears the display device; an image source for generating image light corresponding to image data according to the image data; a first optical component for receiving the image light and making polarized light having a first polarization direction in the image light to pass through; and a second optical component for receiving the polarized light having the first polarization direction and converting it to a polarized light having a second polarization direction which is perpendicular to the first polarization direction, and propagating the polarized light having the second polarization direction to the first optical component, to make the polarized light having the second polarization direction to be reflected to eyes of the user by the first optical component.

In the display device, the first optical component is a polarization light splitter; and the second optical component includes a quarter-wave plate and a reflector, wherein, the quarter-wave plate receives the polarized light having the first polarization direction passing through the first optical component, and the reflector receives light passing through the quarter-wave plate and reflects it back to the quarter-wave plate, and then the quarter-wave plate propagates the polarized light having the second polarization direction to the first optical component.

The display device further includes: a third optical component which is between the image source and the first optical component and is used for propagating the image light generated by the image source to the first optical component; and a fourth optical component which is between the first optical component and the second optical component and is used for propagating the polarized light having the first polarization direction passing through the first optical component to the second optical component and for propagating the polarized light having the second polarization direction from the second optical component to the first optical component.

In the display device, the first optical component, the third optical component and the fourth optical component satisfy predetermined light transmittance, so that the user can not only see an image corresponding to the image data by the display device and also see the surrounding environment of the user through the display device.

In the display device, the third optical component and the fourth optical component are made of resin material, and a refractivity and a transmittance of the resin material is similar to those of glasses.

According to another aspect of this disclosure, there provides a wearable glasses apparatus including: a holding unit for holding a relative position relationship between the wearable glasses apparatus and a user when the user wears the wearable glasses apparatus; a left display unit; and a right display unit.

The left display unit includes: a left image source for generating left image light for being watched by a left eye of the user and corresponding to left image data according to the left image data; a first left optical component for receiving the left image light and making polarized light having a first polarization direction in the left image light to pass through; and a second left optical component for receiving the polarized light having the first polarization direction and converting it to a polarized light having a second polarization direction which is perpendicular to the first polarization direction, and propagating the polarized light having the second polarization direction to the first left optical component, to make the polarized light having the second polarization direction to be reflected to the left eye of the user by the first left optical component.

The right display unit includes: a right image source for generating right image light for being watched by a right eye of the user and corresponding to right image data according to the right image data; a first right optical component for receiving the right image light and making polarized light having a third polarization direction in the right image light to pass through; and a second right optical component for receiving the polarized light having the third polarization direction and converting it to a polarized light having a fourth polarization direction which is perpendicular to the third polarization direction, and propagating the polarized light having the fourth polarization direction to the first right optical component, to make the polarized light having the fourth polarization direction to be reflected to the right eye of the user by the first right optical component.

The left image data is same as or different from the right image data, and the first polarization direction is same as or different from the third polarization direction, and the second polarization direction is same as or different from the fourth polarization direction.

In the wearable glasses apparatus, the first left optical component is a left polarization light splitter and the first right optical component is a right polarization light splitter; and the second left optical component includes a left quarter-wave plate and a left reflector, and the second right optical component includes a right quarter-wave plate and a right reflector.

In the wearable glasses apparatus, the left display device further includes: a third left optical component which is between the left image source and the first left optical component and for propagating the left image light generated by the left image source to the first left optical component; and a fourth left optical component which is between the first left optical component and the second left optical component and for propagating the polarized light having the first polarization direction passing through the first left optical component to the second left optical component and for propagating the polarized light having the second polarization direction from the second left optical component to the first left optical component.

In the wearable glasses apparatus, the right display device further includes: a third right optical component which is between the right image source and the first right optical component and for propagating the right image light generated by the right image source to the first right optical component; and a fourth right optical component which is between the first right optical component and the second right optical component and for propagating the polarized light having the first polarization direction passing through the first right optical component to the second right optical component and for propagating the polarized light having the second polarization direction from the second right optical component to the first right optical component.

In the wearable glasses apparatus, the holding unit holds the left display unit and the right display unit in front of the left eye and the right eye of the user respectively, and holds the left display unit at a first position having a first predetermined distance from the left eye of the user and holds the right display unit at a second position having a second predetermined distance from the right eye of the user, and wherein the first predetermined distance is approximately equal to the second predetermined distance.

BRIEF DESCRIPTION OF THE DRAWINGS

Various kinds of features and advantages of the embodiments are more obvious and more understanding by describing the embodiments with reference to accompanying drawings, in the figures.

DETAILED DESCRIPTION

Hereinafter, the display device and the wearable glasses apparatus according to embodiments of this disclosure are described with reference to the accompanying drawings.

Figure 1:
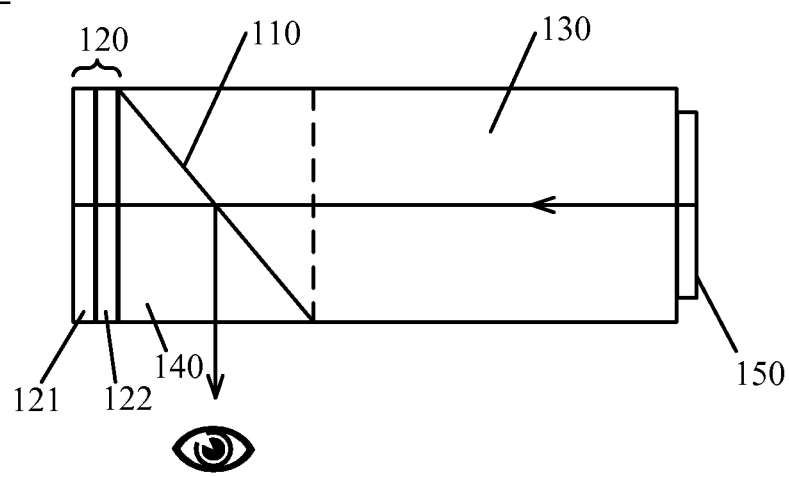
FIG. 1 schematically illustrates a schematic diagram of a structure of a display device according to a first embodiment of the disclosure.

As shown in FIG. 1, it schematically illustrates a schematic diagram of structure of a display device 100 according to the first embodiment of the disclosure.

The display device 100 according to the first embodiment of the disclosure includes an image source 150, a first optical component 110 and a second optical component 120.

The image source 150 generates image light corresponding to image data according to the image data.

The first optical component 110 receives the image light and makes polarized light having a first polarization direction in the image light to pass through.

The second optical component 120 receives the polarized light having the first polarization direction and converts it to a polarized light having a second polarization direction which is perpendicular to the first polarization direction, and propagates the polarized light having the second polarization direction to the first optical component 110, to make the polarized light having the second polarization direction to be reflected to eyes of a watcher (a user) by the first optical component 110.

As described before, the image light is propagated to the first optical component 110 after being generated by the image source 150, and the polarized light having the first polarization direction in the image light passes through the first optical component 110 to be propagated to the second optical component 120, and the second optical component 120 converts the polarized light having the first polarization direction to the polarized light having the second polarization direction and propagates the polarized light having the second polarization direction to the first optical component 110, and then the first optical component 110 reflects the polarized light having the second polarization direction to the eyes of the user.

Since only the polarized light having the first polarization direction in the image light can pass through the first optical component 110, in order to improve the efficiency for light utilization, preferably, the image source 150 generates image light having the first polarization direction, in other words, the image light is preferably the polarized light having the first polarization direction.

The first optical component 110 may be the polarization light splitter, and the polarized light having the first polarization direction can pass through the polarization light splitter, and the polarized light having the second polarization direction which is perpendicular to the first polarization direction is reflected by the polarization light splitter.

The second optical component 120 may include a quarter-wave plate 122 and a reflector 121. As shown in FIG. 1, the quarter-wave plate 122 receives the polarized light having the first polarization direction passing through the first optical component 110, and the reflector 121 receives light passing through the quarter-wave plate 122 and reflects it back to the quarter-wave plate 122, and then the quarter-wave plate 122 propagates the polarized light having the second polarization direction to the first optical component 110.

In the first embodiment, preferably, a third optical component 130 is arranged between the image source 150 and the first optical component 110. The third optical component is between the image source 150 and the first optical component 110 and is used for propagating the image light generated by the image source 150 to the first optical component 110.

In the first embodiment, preferably, a fourth optical component 140 is arranged between the first optical component 110 and the second optical component 120. The fourth optical component 140 is between the first optical component 110 and the second optical component 120 and is used for propagating the polarized light having the first polarization direction passing through the first optical component 110 to the second optical component 120 and is used for propagating the polarized light having the second polarization direction from the second optical component 120 to the first optical component 110.

As shown in FIG. 1, the third optical component 130 may include a first optical part and a second optical part. Cross sections of the first optical part and the second optical part are shown in FIG. 1, wherein the cross section of the first optical part is a rectangle, the cross section of the second optical part is a triangle, and a boundary between the first optical part and the second optical part is shown by a dotted line. The first optical part and the second optical part can be provided separately, or can be provided as a whole.

Preferably, the first optical part is a columnar body, and the image source 150 is jointed with a first end surface of the first optical part, so that the image light generated by the image source 150 is vertically incident on the first end surface of the first optical part.

Preferably, the second optical part is a triangular prism, and a first edge of the second optical part is overlapping with a second end surface of the first optical part.

The polarization light splitter is adhered to a second edge of the triangular prism of the second optical part.

A cross section of the fourth optical part 140 is also shown in FIG. 1, and the cross section of the fourth optical part 140 is triangular.

Preferably, the fourth optical component 140 is a triangular prism, and the quarter-wave plate 122 is adhered to a first edge of the fourth optical component 140, and the polarization light splitter is adhered to a second edge of the fourth optical component 140, and light transmitted from a third edge of the fourth optical component 140 is incident to the eyes of the user.

Preferably, the first optical component 110 is sandwiched between the third optical component 130 and the fourth optical component 140.

Further, though not shown in FIG. 1, the display device 100 according to the first embodiment of the disclosure may also includes a holding unit for holding a relative position relationship between the display device and the user when the user wears the display device. In particular, the holding unit is used for holding the second optical component 120 of the display device or the combination of the second optical component 120 and the fourth optical component 140 at a position of a predetermined distance from the eyes of the user.

The display device 100 according to the first embodiment of the disclosure as shown in FIG. 1 may be made for being watched by one eye, or may be made for being watched by two eyes of the user at the same time.

Further, preferably, the first optical component 110, the third optical component 130 and the fourth optical component 140 satisfy predetermined light transmittance, so that the user can not only see an image corresponding to the image data by the display device 100 and also see the surrounding environment of the user through the display device 100.

Preferably, as shown in FIG. 1, in the display device 100 according to the first embodiment of the disclosure, the first edge of the triangular prism of the first optical part is perpendicular to the third edge thereof, and an angle between the first edge and the second edge is 45 degrees, and the first edge of the triangular prism of the fourth optical component is perpendicular to the third edge thereof, and an angle between the first edge and the second edge is 45 degrees. However, the present disclosure is not limited thereto.

The third optical component 130 and the fourth optical component 140 are preferably made of resin material, and a refractivity and a transmittance of the resin material is similar to those of glasses. Since weight of the resin material is relatively light, the display device 100 according to the first embodiment of the disclosure is easy to implement lightening.

On the other hand, in the display device 100 according to the first embodiment of the disclosure, an interface from an optically denser medium to an optically thinner medium is formed between the third optical component 130 and its surrounding medium, and the polarized light implements a propagation of total reflection in the third optical component 130, a light guide is constituted by using the third optical component 130, the polarization light splitter 110, the fourth optical component 140 and the second optical component 120 together, so that the efficiency for light utilization is very high.

In another aspect, a structure of the display device 100 according to the first embodiment of the disclosure is simple, and the resin material is easy to be processed, so that a mass production is easy to be implemented.

Figure 2:
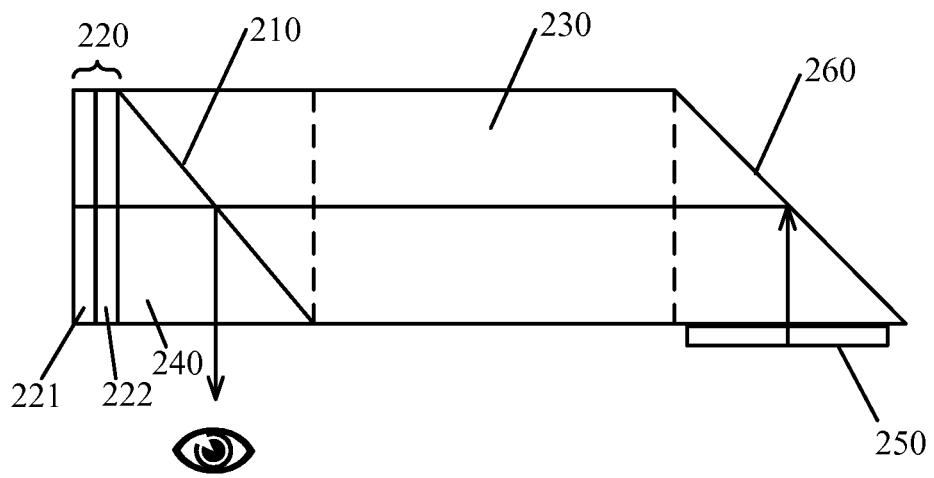
FIG. 2 schematically illustrates a schematic diagram of a structure of a display device according to a second embodiment of the disclosure.

As shown in FIG. 2, it schematically illustrates a schematic diagram of structure of a display device 200 according to the second embodiment of the disclosure.

The display device 200 according to the second embodiment of the disclosure includes an image source 250, a first reflector 260, a first optical component 210 and a second optical component 220.

The image source 250 is used for generating image light corresponding to image data according to the image data.

The first reflector 260 receives the image light from the image source 250 and reflects the image light.

The first optical component 210 receives the image light and makes polarized light having a first polarization direction in the image light to pass through.

The second optical component 220 receives the polarized light having the first polarization direction and converts it to a polarized light having a second polarization direction which is perpendicular to the first polarization direction, and propagates the polarized light having the second polarization direction to the first optical component 210, to make the polarized light having the second polarization direction to be reflected to eyes of a watcher (a user) by the first optical component 210.

As described before, the image light is propagated to the first reflector 260 after being generated by the image source 250, and the reflector 260 reflects the image light, so that the image light may be incident to the first optical component 210, the polarized light having the first polarization direction in the image light passes through the first optical component 210 to be propagated to the second optical component 220, and the second optical component 220 converts the polarized light having the first polarization direction to the polarized light having the second polarization direction and propagates the polarized light having the second polarization direction to the first optical component 210, and then the first optical component 210 reflects the polarized light having the second polarization direction to the eyes of the user.

In the second embodiment, preferably, a fourth optical component 240 is arranged between the first optical component 210 and the second optical component 220.

The image source 250, the first optical component 210, the second optical component 220 and the fourth optical component 240 are same as the image source 150, the first optical component 110, the second optical component 120 and the fourth optical component 240 in the display device 100 according to the first embodiment of the disclosure, and it is no longer described here for redundancy.

The second optical component 220 may include a quarter-wave plate 222 and a second reflector 221, as shown in FIG. 2. The quarter-wave plate 222 and the second reflector 221 are same as the quarter-wave plate 122 and the second reflector 121 in the display device 100 according to the first embodiment of the disclosure, and it is no longer described here for redundancy.

In the second embodiment, preferably, a third optical component 230 for propagating the image light generated by the image source 250 to the first optical component 210 is further arranged between the image source 250, the first reflector 260 and the first optical component 210.

As shown in FIG. 2, the third optical component 230 may include a first optical part, a second optical part and a third optical part, and cross sections of the first optical part, the second optical part and the third optical part are shown, wherein the cross section of the first optical part is rectangle, the cross sections of the second optical part and the third optical part are triangle. A boundary between the first optical part and the third optical part and a boundary between the first optical part and the second optical part are shown in dotted line in FIG. 2 respectively. The first optical part, the second optical part and the third optical part can be provided separately, or can be provided as a whole.

The third optical part may be a triangular prism. The image source 250 is jointed with a first edge of the third optical part, so that the image light generated by the image source 250 is incident to a second edge of the third optical part from the first edge of the third optical part.

The first reflector 260 is adhered to the second edge of the third optical part, and reflects the image light incident to the second edge of the third optical part to a third edge of the third optical part.

The first optical part is a columnar body, and the third edge of the third optical part is overlapped with a first end surface of the first optical part, so that the image light reflected by the first reflector is vertically incident on the first end surface of the first optical part.

Further, the first optical part and the second optical part in the display device 200 according to the second embodiment of the disclosure are same as the first optical part and the second optical part in the display device 100 according to the first embodiment of the disclosure respectively, and it is no longer described for redundancy.

Though the first reflector 250 and the third optical component 230 are described separately above, in case that they exist at the same time, the first reflector 260 can be as a part of the third optical component 222, that is, the second embodiment also includes the following case: the third optical component 222 includes the first optical part, the second optical component, the third optical component and the first reflector 260.

Preferably, as shown in FIG. 2, and in the display device 200 according to the second embodiment of the disclosure, the first edge of the triangular prism of the first optical part is perpendicular to the third edge thereof, and an angle between the first edge and the second edge is 45 degrees, and the first edge of the triangular prism of the third optical part is perpendicular to the third edge thereof, and an angle between the first edge and the second edge is 45 degrees, and a first edge of the triangular prism of the fourth optical component is perpendicular to the third edge thereof, and an angle between the first edge and the second edge is 45 degrees.

Preferably, the first optical component 210, the third optical component 230 and the fourth optical component 240 satisfy predetermined light transmittance, so that the user can not only see an image corresponding to the image data by the display device 200 and also see the surrounding environment of the user through the display device 200.

Further, though not shown in FIG. 2, the display device 200 according to the second embodiment of the disclosure may also includes a holding unit for holding a relative position relationship between the display device 200 and the user when the user wears the display device 200. In particular, the holding unit is used for holding the second optical component 220 of the display device 200 or the combination of the second optical component 220 and the fourth optical component 240 at a position of a predetermined distance from the eyes of the user.

The display device 200 according to the second embodiment of the disclosure may be made for being watched by one eye, or may be made for being watched by two eyes of the user at the same time as the display device 100 according to the first embodiment of the disclosure.

In the display device 200 according to the second embodiment of the disclosure, the third optical component 230 and the fourth optical component 240 are preferably made of resin material, and a refractivity and a transmittance of the resin material is similar to those of glasses. Since weight of the resin material is relatively light, the display device 200 according to the second embodiment of the disclosure is easy to implement lightening.

On the other hand, in the display device 200 according to the second embodiment of the disclosure, an interface from an optically denser medium to an optically thinner medium is formed between the third optical component 230 and its surrounding medium, and the polarized light implements a propagation of total reflection in reflector 230, a light guide is constituted by using the third optical component 230, the reflector 260, the polarization light splitter 110, the fourth optical component 240 and the second optical component 220 together, so that the efficiency for light utilization is very high.

In another aspect, a structure of the display device 200 according to the second embodiment of the disclosure is simple, and the resin material is easy to be processed, so that a mass production is easy to be implemented.

Figure 3:
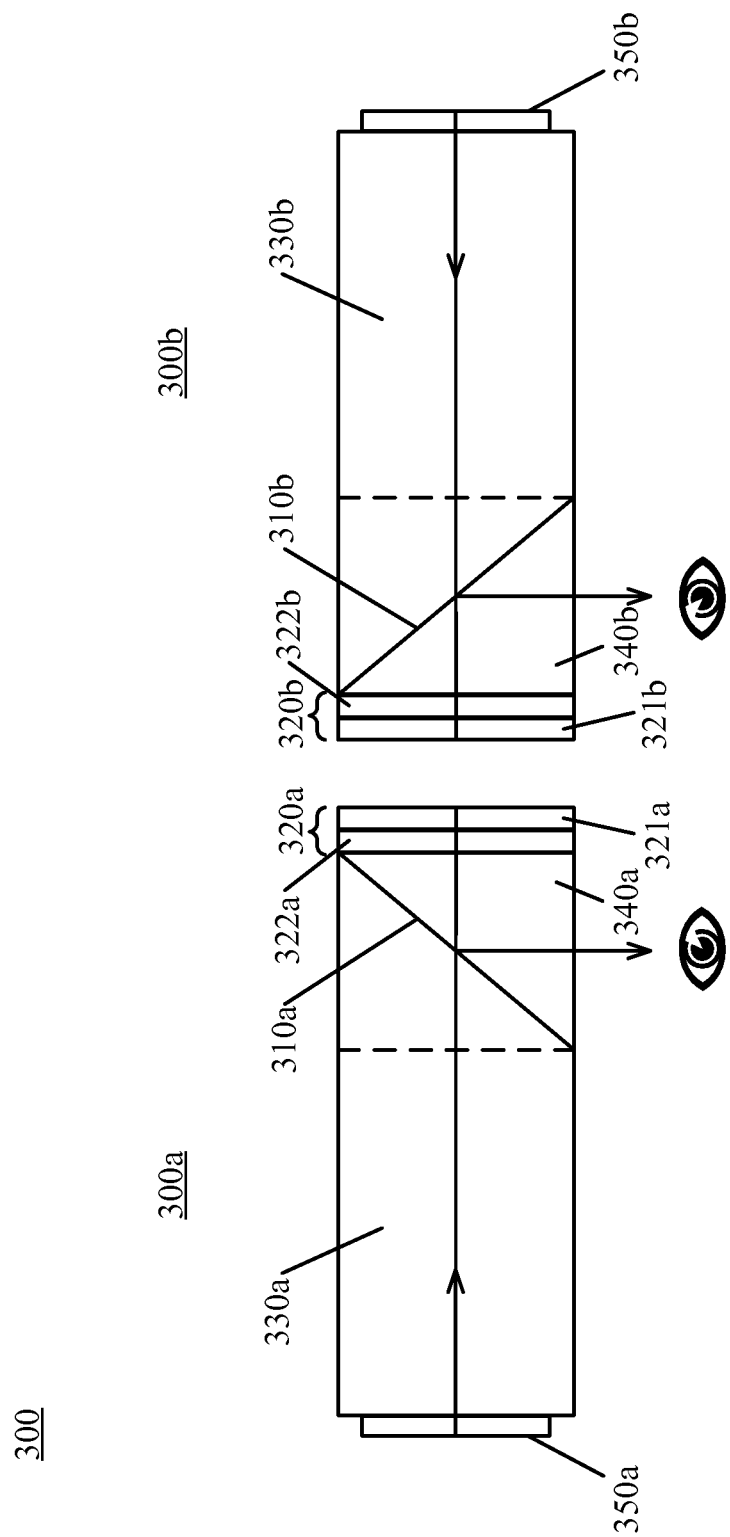
FIG. 3 schematically illustrates a schematic diagram of a structure of a wearable glasses apparatus according to a first embodiment of the disclosure.

As shown in FIG. 3, it schematically illustrates a schematic diagram of structure of a wearable glasses apparatus 300 according to the first embodiment of the disclosure.

The wearable glasses apparatus 300 of the first embodiment of the disclosure includes a holding unit (not shown in FIG. 3), a left display unit 300a and a right display unit 300b.

Figure 5:
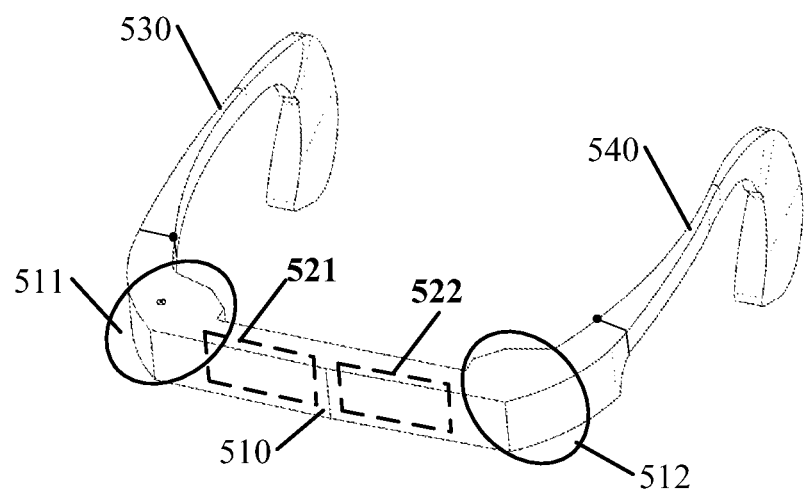
FIG. 5 schematically illustrates appearance structures of the wearable glasses apparatus according to the first and second embodiments of the disclosure.

The left display device 300a and the right display unit 300b can adopt the display device 100 as shown in FIG. 1. The holding unit is for holding a relative position relationship between the wearable glasses apparatus and a user when the user wears the wearable glasses apparatus. FIG. 5 shows an example of the holding unit. In FIG. 5, the left display unit 300a is accommodated in a first left part 511 and a second left part 521, and the right display unit 300b is accommodated in a first right part 512 and a second right part 522.

As shown in FIG. 5, the holding unit holds the left display unit 300a and the right display unit 300b in front of a left eye and a right eye of the user respectively, and in particular holds the left display unit 300a at a first position of a first predetermined distance from the left eye of the user, and holds the right display unit 300b at a second position of a second predetermined distance from the right eye of the user. The first predetermined distance is approximately equal to the second predetermined distance.

The left display unit 300a includes: a left image source 350a, a first left optical component 310a and a second left optical component 320a.

The left image source 350a generates left image light which is corresponding to left image data and being watched by the left eye of the user according to the left image data.

The first left optical component 310a receives the left image light and makes polarized light having a first polarization direction in the left image light to pass through.

The second left optical component 320a receives the polarized light having the first polarization direction and converts it to a polarized light having a second polarization direction which is perpendicular to the first polarization direction, and propagates the polarized light having the second polarization direction to the first left optical component 310a, to make the polarized light having the second polarization direction to be reflected to the left eye of the user by the first left optical component 310a.

The right display unit 300b includes: a right image source 350b, a first right optical component 310b and a second right optical component 320b.

The right image source 350b generates right image light which is corresponding to right image data and being watched by the right eye of the user according to the right image data.

The first right optical component 310b receives the right image light and makes polarized light having a third polarization direction in the right image light to pass through.

The second right optical component 320b receives the polarized light having the third polarization direction and converts it to a polarized light having a fourth polarization direction which is perpendicular to the third polarization direction, and propagates the polarized light having the fourth polarization direction to the first right optical component 310b, to make the polarized light having the fourth polarization direction to be reflected to the right eye of the user by the first right optical component 310b.

The left image data may be same as or different from the right image data.

The first polarization direction may be same as or different from the third polarization direction, correspondingly, the second polarization direction may be the same as or different from the fourth polarization direction.

The first left optical component 310a may be a left polarization light splitter and the first right optical component 310b may be a right polarization light splitter.

The second left optical component 320a includes a left quarter-wave plate 322a and a left reflector 321a, and the second right optical component 320b includes a right quarter-wave plate 322b and a right reflector 321b.

The left quarter-wave plate 322a receives the polarized light having the first polarization direction passing through the first left optical component 310a, and the left reflector 321a receives light passing through the left quarter-wave plate 322a and reflects it back to the left quarter-wave plate 322a, and then, the left quarter-wave plate 322a propagates the polarized light having the second polarization direction to the first left optical component 310a.

Similarly, the right quarter-wave plate 322b receives the polarized light having the third polarization direction passing through the first right optical component 310b, and the right reflector 321b receives light passing through the right quarter-wave plate 322b and reflects it back to the right quarter-wave plate 322b, and then the right quarter-wave plate 322b propagates the polarized light having the fourth polarization direction to the first right optical component 310b.

As shown in FIG. 3, the left display unit 300a may also include: a third left optical component 330a and a fourth left optical component 340a.

The third left optical component 330a is between the left image source 350a and the first left optical component 310a and is used for propagating the left image light generated by the left image source 350a to the first left optical component 310a.

The fourth left optical component 340a is between the first left optical component 310a and the second left optical component 320a and is used for propagating the polarized light having the first polarization direction passing through the first left optical component 310a to the second left optical component 320a and is used for propagating the polarized light having the second polarization direction from the second left optical component 320a to the first left optical component 310a.

The right display unit 300b may also include: a third right optical component 330b and a fourth right optical component 340b.

The third right optical component 330b is between the right image source 350b and the first right optical component 310b and is used for propagating the right image light generated by the right image source 350b to the first right optical component 310b.

The fourth right optical component 340b is between the first right optical component 310b and the second right optical component 320b and is used for propagating the polarized light having the first polarization direction passing through the first right optical component 310b to the second right optical component 320b and is used for propagating the polarized light having the second polarization direction from the second right optical component 320b to the first right optical component 310b.

Further, the first left optical component 310a, the second left optical component 320a, the third left optical component 330a and the fourth left optical component 340a are same as the first optical component 110, the second optical component 120, the third optical component 130 and the fourth optical component 140 shown in FIG. 1 respectively, and it is no longer described here for redundancy.

Further, the first right optical component 310b, the second right optical component 320b, the third right optical component 330b and the fourth right optical component 340b are same as the first optical component 110, the second optical component 120, the third optical component 130 and the fourth optical component 140 shown in FIG. 1 respectively, and it is no longer described here for redundancy.

Figure 4:
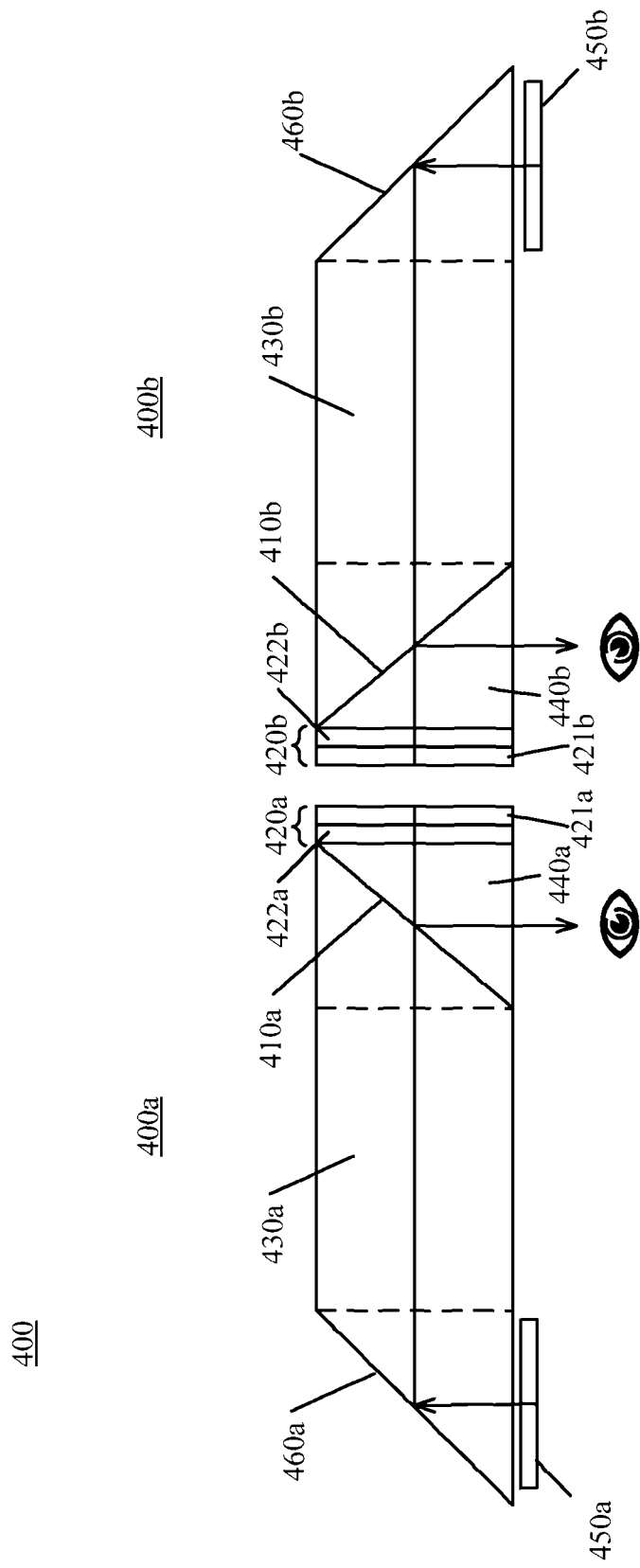
FIG. 4 schematically illustrates a schematic diagram of a structure of a wearable glasses apparatus according to a second embodiment of the disclosure.

FIG. 4 schematically illustrates a schematic diagram of structure of a wearable glasses apparatus according to the second embodiment of the disclosure.

As shown in FIG. 4, the wearable glasses apparatus 400 of the second embodiment of the disclosure also includes a holding unit (not shown in FIG. 4), a left display unit 400a and a right display unit 400b.

The left display device 400a and the right display unit 400b can adopt the display device as shown in FIG. 2. The holding unit is for holding a relative position relationship between the wearable glasses apparatus and a user when the user wears the wearable glasses apparatus. FIG. 5 shows an example of the holding unit. In FIG. 5, the left display unit 400a is accommodated in a first left part 511 and a second left part 521, and the right display unit 400b is accommodated in a first right part 512 and a second right part 522.

The left display unit 400a includes a left image source 450a, a first left reflector 460a, a first left optical component 410a and a second left optical component 410b.

The left image source 450a generates left image light which is corresponding to left image data and being watched by the left eye of the user according to the left image data.

The first left reflector 460a receives the left image light from the left image source 450a and reflects the left image light.

The first left optical component 410a receives the left image light and makes polarized light having a first polarization direction in the left image light to pass through.

The second left optical component 420a receives the polarized light having the first polarization direction and converts it to a polarized light having a second polarization direction which is perpendicular to the first polarization direction, and propagates the polarized light having the second polarization direction to the first left optical component 410a, to make the polarized light having the second polarization direction to be reflected to the left eye of the user by the first left optical component 410a.

The right display unit 400b includes: a right image source 450b, a first right reflector 460b, a first right optical component 410b and a second right optical component 420b.

The right image source 450b generates right image light which is corresponding to right image data and being watched by the right eye of the user according to the right image data.

The first right reflector 460b receives the right image light from the right image source 450b and reflects the right image light.

The first right optical component 410b receives the right image light and makes polarized light having a third polarization direction in the right image light to pass through.

The second right optical component 420b receives the polarized light having the third polarization direction and converts it to a polarized light having a fourth polarization direction which is perpendicular to the third polarization direction, and propagates the polarized light having the fourth polarization direction to the first right optical component 410b, to make the polarized light having the fourth polarization direction to be reflected to the right eye of the user by the first right optical component 410b.

The left image data may be same as or different from the right image data.

The first polarization direction may be same as or different from the third polarization direction, correspondingly, the second polarization direction may be the same as or different from the fourth polarization direction.

The first left optical component 410a may be a left polarization light splitter and the first right optical component 410b may be a right polarization light splitter.

The second left optical component 420a includes a left quarter-wave plate 422a and a left reflector 421a, and the second right optical component 420b includes a right quarter-wave plate 422b and a right reflector 421b.

The left quarter-wave plate 422a, the left reflector 421a, the right quarter-wave plate 422b and the right reflector 421b are same as the left quarter-wave plate 322a, the left reflector 321a, the right quarter-wave plate 322b and the right reflector 321b shown in FIG. 3 respectively, and it is no longer described here for redundancy.

As shown in FIG. 4, the left display unit 400a may also include: a third left optical component 430a and a fourth left optical component 440a.

The right display unit 400b may also include: a third right optical component 430b and a fourth right optical component 440b.

Further, the first left optical component 410a, the second left optical component 420a, the third left optical component 430a and the fourth left optical component 440a are same as the first optical component 210, the second optical component 220, the third optical component 230 and the fourth optical component 240 shown in FIG. 2 respectively, and it is no longer described here for redundancy.

Further, the first right optical component 410b, the second right optical component 420b, the third right optical component 430b and the fourth right optical component 440b are same as the first optical component 210, the second optical component 220, the third optical component 230 and the fourth optical component 240 shown in FIG. 2 respectively, and it is no longer described here for redundancy.

FIG. 5 schematically illustrates appearance schematic diagrams of the wearable glasses apparatus according to the first and second embodiments of the disclosure.

As shown in FIG. 5, the holding device includes a first holding portion 540, a second holding portion 510 and a third holding portion 530.

The first holding portion 540 is positioned at left side of the left display unit (300a or 400a) accommodated in 512 and 522, and includes a straight line portion and a bent portion for bracketing on a left ear of the user.

The second holding portion 530 is positioned at right side of the right display unit (300b or 400b) accommodated in 511 and 521, and includes a straight portion and a bent portion for bracketing on a right ear of the user.

The third holding portion 510 is positioned between the left display unit and the right display unit for bracketing on a nose of the user.

However, implement forms of the wearable glasses apparatus according to the first and second embodiments of the disclosure are not limited to appearance shapes as shown in FIG. 5, but have different appearance shapes according to different needs, this disclosure is not limited to a specific implement form of appearance thereof.

The display device and the wearable glasses apparatus according to this disclosure not only have a higher optical utilization ratio and also easy to implement lightening, and is easier to implement mass production.

The display device and the wearable glasses apparatus according to this disclosure are described with reference to the accompanying drawings above. Those skilled in the art can understand, this disclosure is not limited to the above-described embodiments, and various modifications can be made without departing from a spirit of this disclosure, and these modifications should be included in a range of this disclosure. The range of this disclosure should be defined by append claims and equivalence thereof.

The invention claimed is:

1. A display device comprising:
a holding unit for holding a relative position relationship between the display device and a user when the user wears the display device;
an image source for generating image light corresponding to image data according to the image data;
a first optical component for receiving and filtering the image light and only making polarized light having a first polarization direction in the image light to pass through; and
a second optical component for receiving the polarized light having the first polarization direction which has passed through the first optical component and converting it to a polarized light having a second polarization direction which is perpendicular to the first polarization direction, and propagating the polarized light having the second polarization direction to the first optical component, to make the polarized light having the second polarization direction to be reflected to eyes of the user by the first optical component.

2. The display device according to claim 1, wherein,
the first optical component is a polarization light splitter;
the second optical component includes a quarter-wave plate and a reflector; and
the quarter-wave plate receives the polarized light having the first polarization direction passing through the first optical component, and the reflector receives light passing through the quarter-wave plate and reflects it back to the quarter-wave plate, and then the quarter-wave plate propagates the polarized light having the second polarization direction to the first optical component.

3. The display device according to claim 2, further comprising:
a third optical component which is between the image source and the first optical component and is used for propagating the image light generated by the image source to the first optical component; and
a fourth optical component which is between the first optical component and the second optical component and is used for propagating the polarized light having the first polarization direction passing through the first optical component to the second optical component and is used for propagating the polarized light having the second polarization direction from the second optical component to the first optical component.

4. The display device according to claim 3, wherein,
the third optical component includes a first optical part and a second optical part;
the first optical part is a columnar body, and the image source is jointed with a first end surface of the first optical part, so that the image light generated by the image source vertically incident on the first end surface of the first optical part;
the second optical part is a triangular prism, and a first edge of the second optical part is overlapped with a second end surface of the first optical part; and
the polarization light splitter is adhered to a second edge of the triangular prism of the second optical part.

5. The display device according to claim 3, wherein,
the first optical component includes a first optical part, a second optical part, a third optical part and a second reflector,
the third optical part is a triangular prism, and the image source is jointed with a first edge of the third optical part, so that the image light generated by the image source is incident to a second edge of the third optical part from the first edge of the third optical part;
the second reflector is adhered to the second edge of the third optical part, and reflects the image light incident to the second edge of the third optical part to a third edge of the third optical part;
the first optical part is a columnar body, and the third edge of the third optical part is overlapped with a first end surface of the first optical part, so that the image light reflected by the second reflector is vertically incident on the first end surface of the first optical part;
the second optical part is a triangular prism, and a first edge of the second optical part is overlapped with a second end surface of the first optical part; and
the polarization light splitter is adhered to a second edge of the triangular prism of the second optical part.

6. The display device according to claim 3, wherein,
the fourth optical component is a triangular prism, and the quarter-wave plate is adhered to a first edge of the fourth optical component, and the polarization light splitter is adhered to a second edge of the fourth optical component, and light transmitted from a third edge of the fourth optical component is incident to the eyes of the user.

7. The display device according to claim 1, wherein,
the first optical component, the third optical component and the fourth optical component satisfy predetermined light transmittance, so that the user can not only see an image corresponding to the image data by the display device and also see surrounding environment of the user through the display device.

8. The display device according to claim 7, wherein,
the third optical component and the fourth optical component are made of resin material, and a refractivity and a transmittance of the resin material is similar to those of glasses.

9. The display device according to claim 4, wherein,
the first edge of the triangular prism of the first optical part is perpendicular to the third edge thereof, and an angle between the first edge and the second edge is 45 degrees.

10. The display device according to claim 5, wherein,
the first edge of the triangular prism of the first optical part is perpendicular to the third edge thereof, and an angle between the first edge and the second edge is 45 degrees; and
the first edge of the triangular prism of the third optical part is perpendicular to the third edge thereof, and an angle between the first edge and the second edge is 45 degrees.

11. The display device according to claim 4, wherein,
the first edge of the triangular prism of the fourth optical component is perpendicular to the third edge thereof, and an angle between the first edge and the second edge is 45 degrees.

12. The display device according to claim 1, wherein,
the image source projects the polarized light having the first polarization direction.

13. A wearable glasses apparatus comprising:
a holding unit for holding a relative position relationship between wearable glasses apparatus and a user when the user wears the wearable glasses apparatus;
a left display unit; and
a right display unit,
wherein, the left display unit comprising:
a left image source for generating left image light which is corresponding to left image data and being watched by a left eye of the user according to the left image data;
a first left optical component for receiving the left image light and making polarized light having a first polarization direction in the left image light to pass through; and
a second left optical component for receiving the polarized light having the first polarization direction and converting it to a polarized light having a second polarization direction which is perpendicular to the first polarization direction, and propagating the polarized light having the second polarization direction to the first left optical component, to make the polarized light having the second polarization direction to be reflected to the left eye of the user by the first left optical component;
and, the right display unit comprising:
a right image source for generating right image light which is corresponding to right image data and being watched by the right eye of the user according to the right image data;
the first right optical component for receiving the right image light and making polarized light having a third polarization direction in the right image light to pass through; and
a second right optical component for receiving the polarized light having the third polarization direction and converting it to a polarized light having a fourth polarization direction which is perpendicular to the third polarization direction, and propagating the polarized light having the fourth polarization direction to the first right optical component, to make the polarized light having the fourth polarization direction to be reflected to the right eye of the user by the first right optical component,
the left image data is same as or different from the right image data, and the first polarization direction is same as or different from the third polarization direction, and the second polarization direction is same as or different from the fourth polarization direction.

14. The wearable glasses apparatus according to claim 13, wherein,
the first left optical component is a left polarization light splitter and the first right optical component is a right polarization light splitter; and
the second left optical component includes a left quarter-wave plate and a left reflector, and the second right optical component includes a right quarter-wave plate and a right reflector,
wherein the left quarter-wave plate receives the polarized light having the first polarization direction passing through the first left optical component, and the left reflector receives light passing through the left quarter-wave plate and reflect it back to the left quarter-wave plate, and then, the left quarter-wave plate propagates the polarized light having the second polarization direction to the first left optical component; and
the right quarter-wave plate receives the polarized light having the third polarization direction passing through the first right optical component, and the right reflector receives light passing through the right quarter-wave plate and reflect it back to the right quarter-wave plate, and then the right quarter-wave plate propagates the polarized light having the fourth polarization direction to the first right optical component.

15. The wearable glasses apparatus according to claim 14, wherein, the left display unit further comprising:
a third left optical component which is between the left image source and the first left optical component and is used for propagating the left image light generated by the left image source to the first left optical component; and
a fourth left optical component which is between the first left optical component and second left optical component and is used for propagating the polarized light having the first polarization direction passing through the first left optical component to the second left optical component and is used for propagating the polarized light having the second polarization direction from second left optical component to the first left optical component;
wherein, the right display unit further comprising:
a third right optical component which is between the right image source and the first right optical component and is used for propagating the right image light generated by the right image source to the first right optical component; and
a fourth right optical component which is between the first right optical component and the second right optical component and is used for propagating the polarized light having the first polarization direction passing through the first right optical component to the second right optical component and is used for propagating the polarized light having the second polarization direction from the second right optical component to the first right optical component.

16. The wearable glasses apparatus according to claim 13, wherein,
the holding unit holds the left display unit and the right display unit in front of a left eye and a right eye of the user respectively, and holds the left display unit at a first position of a first predetermined distance from the left eye of the user, and holds the right display unit at a second position of a second predetermined distance from the right eye of the user;
wherein, the first predetermined distance is approximately equal to the second predetermined distance.

\* \* \* \* \*